Feb. 18, 1930.  V. LINK  1,747,518
VEHICLE BRAKE
Filed June 8, 1923  4 Sheets-Sheet 1
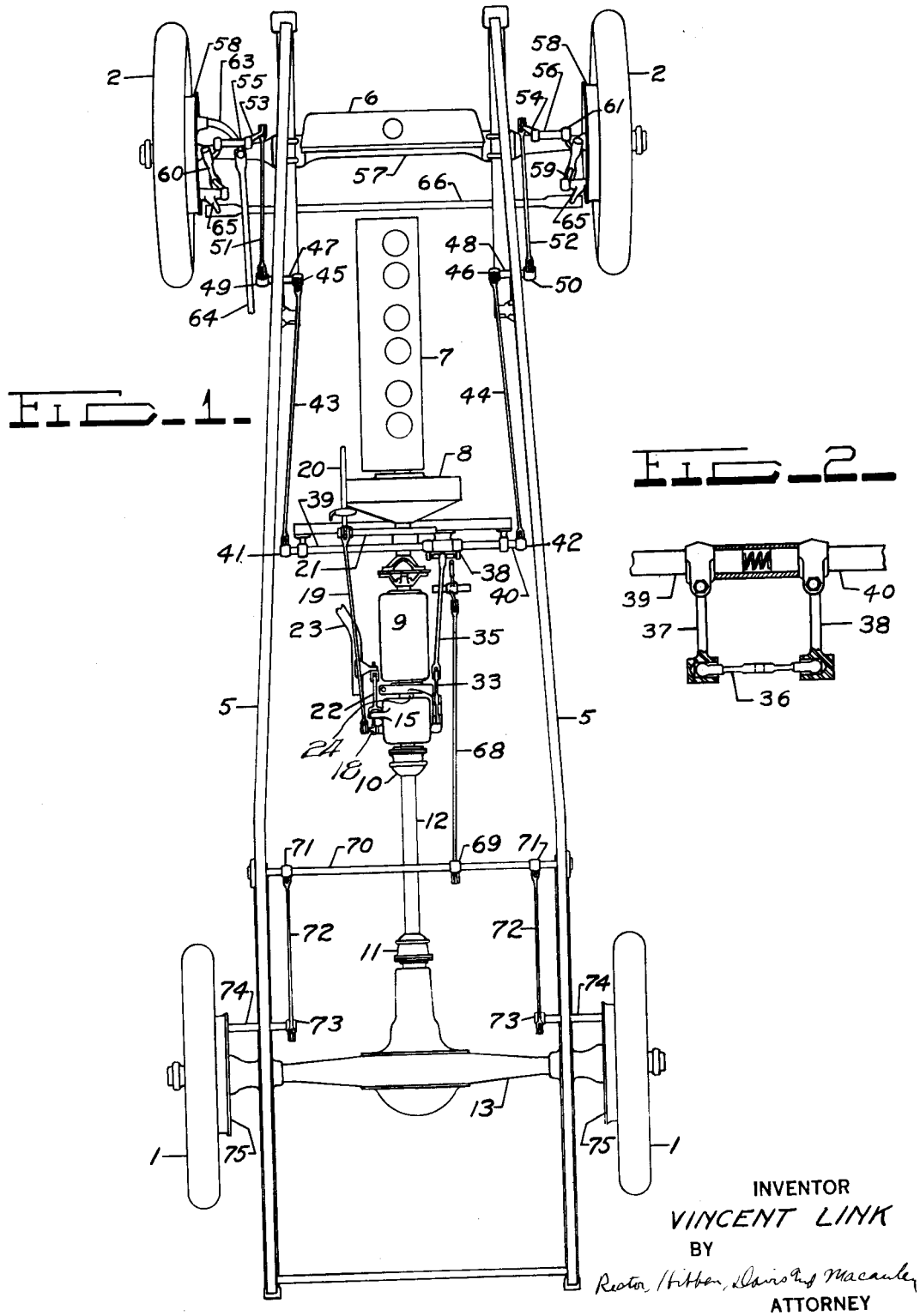
INVENTOR
*VINCENT LINK*
BY
ATTORNEY

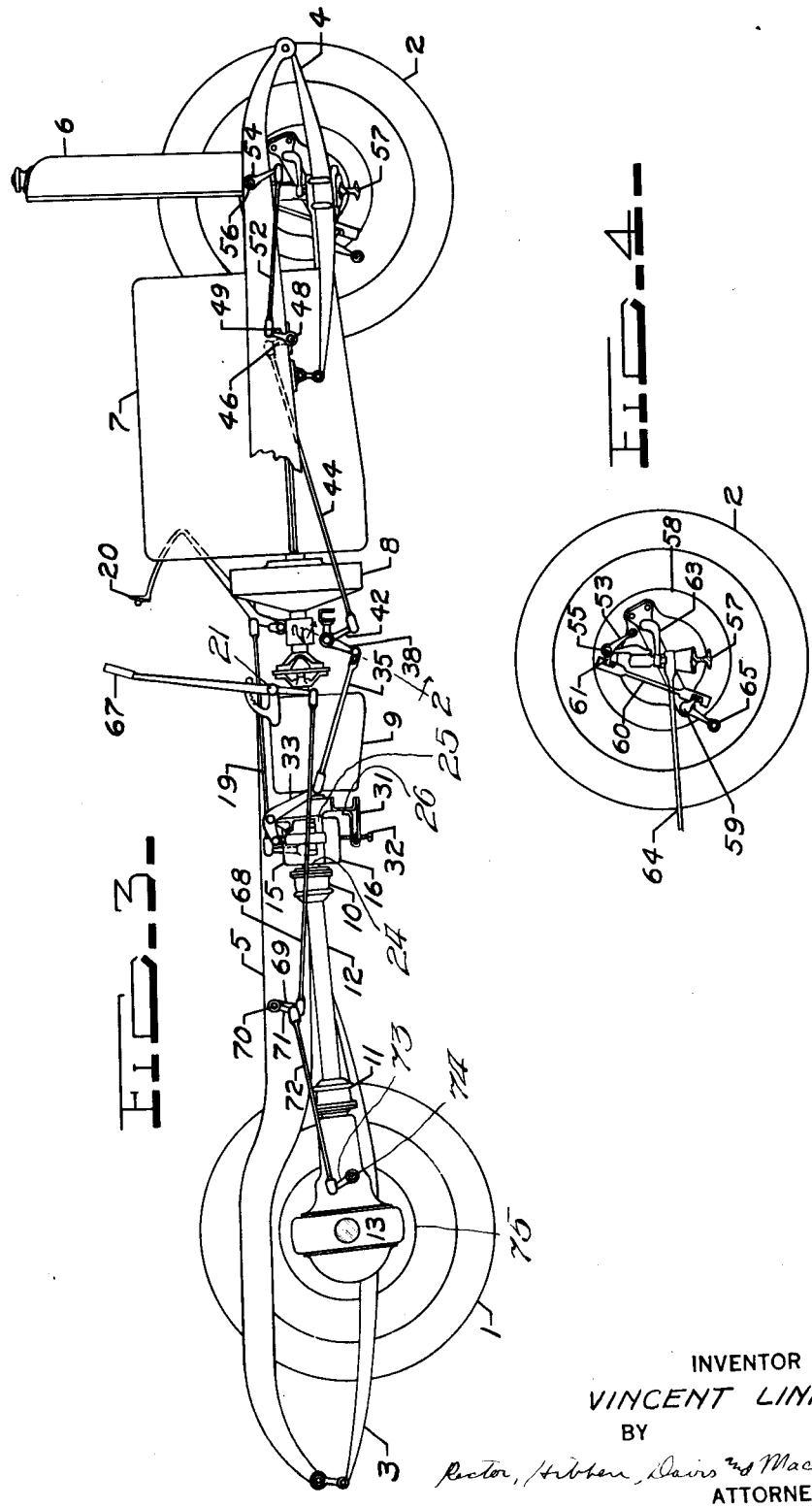

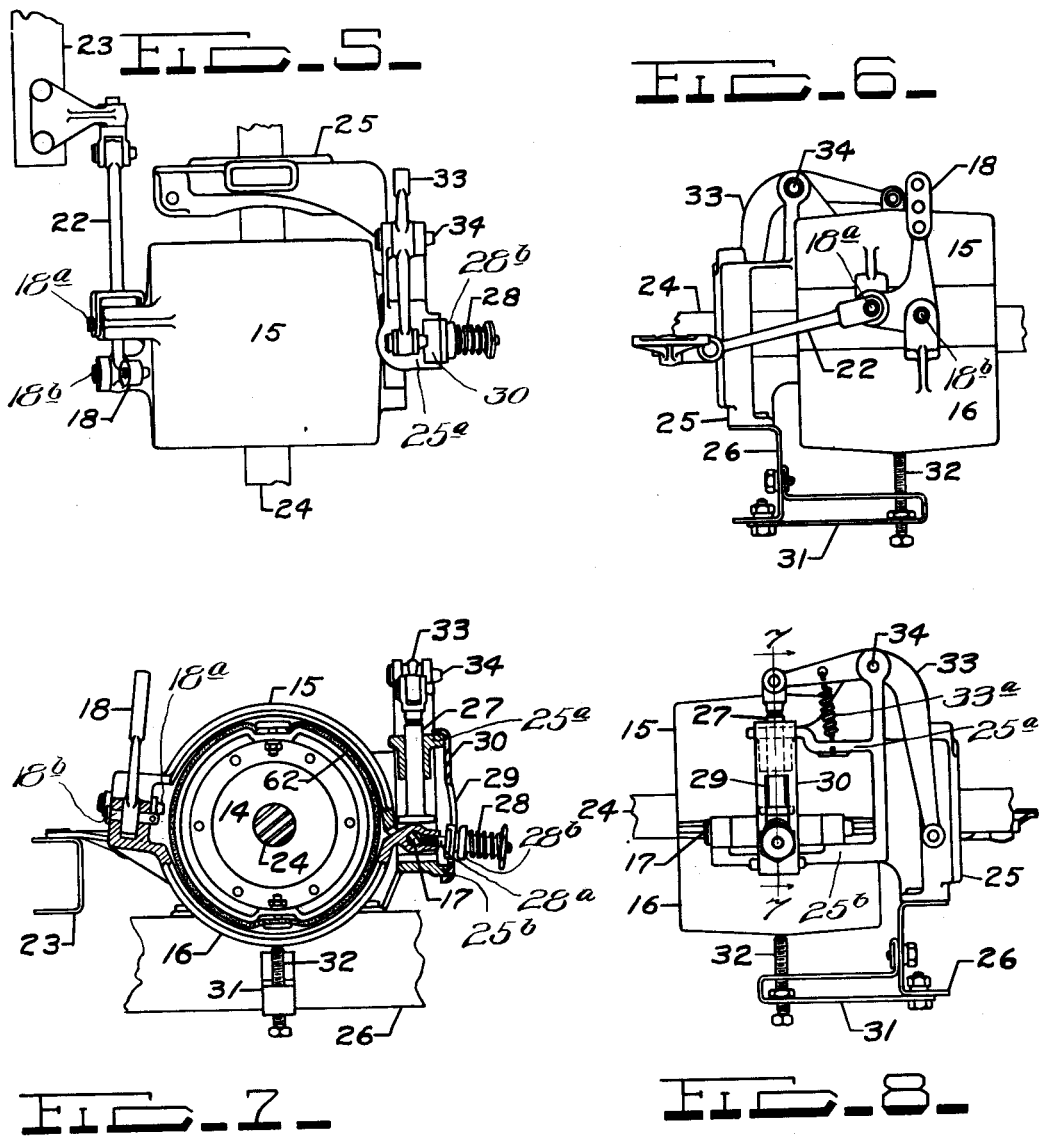

Feb. 18, 1930.   V. LINK   1,747,518
VEHICLE BRAKE
Filed June 8, 1923   4 Sheets-Sheet 4
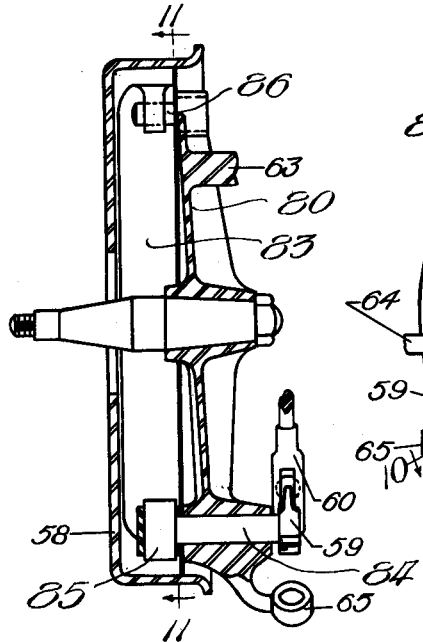
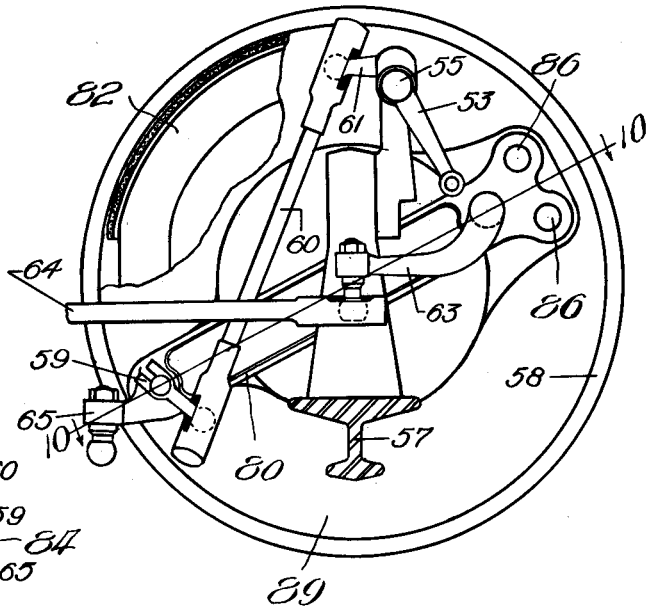
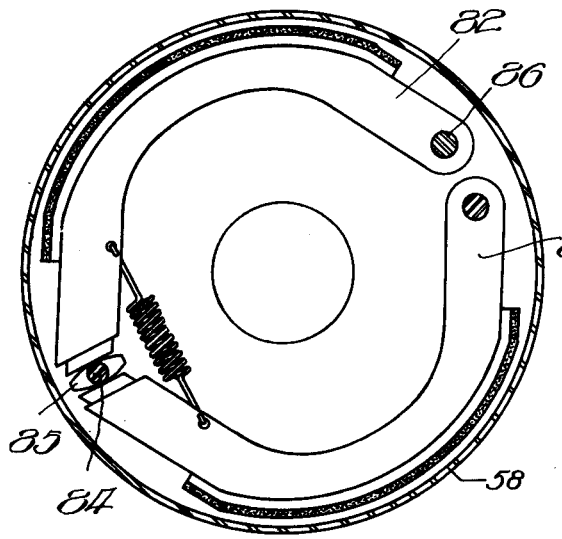
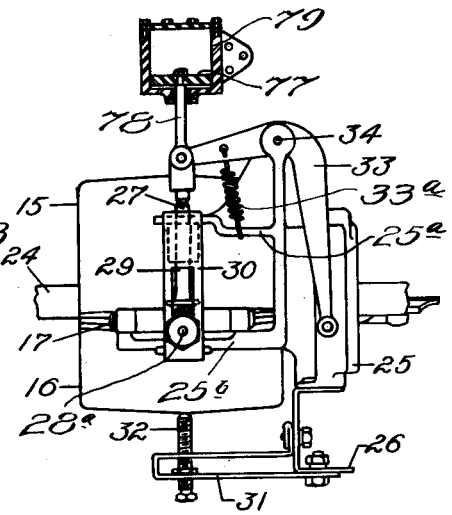
INVENTOR
*VINCENT LINK*
BY
ATTORNEY Patented Feb. 18, 1930

1,747,518

UNITED STATES PATENT OFFICE

VINCENT LINK, OF DETROIT, MICHIGAN, ASSIGNOR TO STUDEBAKER CORPORATION, OF DETROIT, MICHIGAN, A CORPORATION OF NEW JERSEY

VEHICLE BRAKE

Application filed June 8, 1923. Serial No. 644,078.

This invention relates to brakes for vehicles and more particularly to braking means for all of the wheels.

The principal object of the invention is to provide means whereby, when a braking effect is applied to one wheel or a set of wheels, that braking effect operates to apply brake means for another wheel or set of wheels by utilizing the movement of the vehicle. I am aware that there are braking systems, heretofore devised, wherein the movement of the vehicle is utilized to apply the brakes, but in each of these systems, the device which is operated by movement of the vehicle and which is used to apply the brakes does not materially, and is not intended to, act as a brake for the vehicle. In my present invention the brake part actuated automatically by the movement of the vehicle not only acts as a brake itself for the parts causing its rotation but also acts to apply brakes on parts independent thereof.

In the accompanying drawings, which show a preferred form of embodiment of my present invention, a brake drum is applied to the rear end of the transmission shaft of an automobile, the transmission shaft being directly connected to both rear wheels through the propeller shaft and axle shafts, and the term "transmission brake" as used in certain of the appended claims refers to this type of brake for applying braking effort to the propelling mechanism and hence to the drive wheels for the purpose of retarding or stopping movement of the vehicle. This type of brake is that generaly known as a transmission brake, but it will be understood that I have employed this type of brake so applied for the purposes of illustration, and that other types of brakes applied to other moving parts of the vehicle may be used if desired. In my preferred form, the brake shoes which frictionally engage the drum on the transmission shaft are operated under the control of the operator of the vehicle and so constructed as to be capable of a limited amount of rotation around the drum center. This rotational movement, caused by the braking effect of the shoes on the revolving drums, is utilized by suitable connections to operate braking devices on the front wheels. The connections are so proportioned that the braking effect of the transmission brake is greater than that of the front wheel brakes, the braking effect of the front wheel brakes being limited to prevent locking of the front wheels against rotation. A suitable cushioning device, which in my preferred embodiment is in the form of a dash-pot, is associated with the operating connections to dampen and prevent chattering of the braking mechanism.

With the above and incidental objects in view, the invention consists in certain novel features of construction and combination of parts, the essential elements whereof are recited in the appended claims and a preferred form of embodiment of which is described in detail hereinafter and illustrated in full in the accompanying drawings which form part of this specification.

Of said drawings, Fig. 1 is a plan view of a motor vehicle, with the body removed, showing the preferred form of embodiment of my invention incorporated therein; Fig. 2 is a partly sectional view showing the equalizing means for the front wheel brakes, the section being taken substantially on the line 2—2 of Fig. 3; Fig. 3 is a right-hand side elevation of the motor vehicle of Fig. 1, with parts of the chassis broken away; Fig. 4 is an inner side view of one of the front wheels with its brake mechanism applied; Fig. 5 is a plan view of the transmission brake; Fig. 6 is a left-hand side elevation of the transmission brake; Fig. 7 is a rear view of the transmission brake showing the operating connections associated therewith in section, as on the line 7—7 of Fig. 8; Fig. 8 is a right-hand side elevation of the transmission brake; Fig. 9 is an inner side detail view of one of the front wheel brakes, the front axle being shown in section; Fig. 10 is a detail section on line 10—10 of Fig. 9; Fig. 11 is a detail section taken on the line 11—11 of Fig. 10, and Fig. 12 is a right-hand side view of the transmission brake mechanism showing as a modification a cushioning dash-pot shown in section connected therewith.

The drawings show, more or less diagrammatically, a vehicle including rear wheels 1, front wheels 2, rear springs 3, front springs 4, frame 5, radiator 6, engine 7, flywheel and clutch 8, transmission 9, universal joints 10 and 11, propeller shaft 12, and rear axle 13, with other features incorporated therein as will be hereinafter described. As is usual in such vehicles, the rotational movement of the engine 7 is transmitted through the clutch 8, transmission 9, universal joints 10 and 11, propeller shaft 12, the axle shafts of the rear axle 13, to the driving wheels 1. At the rear end of a transmission shaft 24 is secured a brake drum 14 of the transmission brake so that any retardation of the drum 14 causes a relative retardation of the rotation of the rear wheels 1 and therefore of the vehicle. In order to apply a retarding effect on the rotation of the drum 14, two brake shoes 15 and 16 are suitably mounted to frictionally engage the same when operated under the control of the operator of the vehicle. These two brake shoes 15 and 16 at their right-hand ends (Figs. 7 and 8) are provided with laterally projecting eyes connected together by a pin 17 to form a hinge joint. The opposite ends of the brake shoes 15 and 16 are provided with integral projections or brackets and are pivoted by pins 18$^a$ and 18$^b$, respectively, to a bell crank lever 18 (Figs. 5, 6 and 7). The upper end of the vertical arm of the bell crank lever 18 is pivotally connected to the rear end of a rod 19 which at its forward end is secured to the lower end of a manually operated lever 20, which is preferably in the form of a foot pedal pivotally mounted on a member 21 suitably supported by the frame 5.

Forward movement of the foot pedal 20 causes the brake shoes 15 and 16 to be drawn together by the camming action of the bell crank 18, thus causing the brake shoes to frictionally engage the brake drum 14 which is provided with suitable frictional material 62. A radius rod 22, fastened at its rear yoked end by the pin 18$^a$ to the bracket on the shoe 15 serves to hold the brake shoes 15 and 16 with their accompanying mechanism in correct longitudinal position, the forward end of the radius rod 22 being secured to a bracket on a suitable sub-frame 23, a portion only of which is shown. A bracket 25, suitably fastened to and positioned on a frame cross-member 26 serves to partially support the brake shoes 15 and 16 and their accompanying mechanism. The bracket 25 is formed with integral and rearwardly projecting horizontal arms 25$^a$ and 25$^b$ between which the projecting right-hand ends of the brake shoes 15 and 16, connected by the pin 17, are positioned. The upper arm of the yoke is provided with a vertical bearing or boss receiving a plunger 27, and the head of the plunger on its lower end rests on the right-hand projecting end or eye of the brake shoe 16. For the purpose of normally maintaining the normal horizontal radial alignment of the brake shoes 15 and 16 with respect to the sides of the brake drum 14, a spring device is employed as best shown in Figs. 7 and 8. This device comprises a rod 28$^a$, threaded at its inner end into the right-hand projecting end of the brake shoe 16, a member 28$^b$ sleeved on the rod 28$^a$, an encircling spring 28, and a vertical plate 30 secured to the arms 25$^a$ and 25$^b$ and provided with a curved portion, which is concentric with the drum 14 and slotted at 29. The member 28$^b$ projects through the slot 29 and the spring 28 maintains part of the member 28$^a$ in firm frictional engagement with the plate 30 to preserve the proper transverse relationship between the brake shoes and brake drum. Another bracket 31, which projects rearwardly under the brake-shoe 16 and is fastened to the cross-member 26, is provided with a vertically adjustable screw 32 upon the upper end of which normally rests the brake shoe 16 to support the brake shoes 15 and 16 in proper vertical relation from the upper and lower parts of the drum 14, while the brake is not applied.

The upper end of the plunger 27 is suitably connected to the horizontal arm of a bell-crank lever 33 which is pivoted at 34 on the bracket 25, the connection between the upper end of the plunger and the arm of the bell crank lever 33 being such as to permit the plunger to be moved in a vertical line while the end of the arm of the bell crank describes a slight arc when the lever is rocked, thus compensating for the pivotal movement of the lever. The lower end of the vertical arm of the bell crank lever 33 is connected to the rear end of a rod 35 (Fig. 3) which at its forward end is secured to an equalizing bar 36 (best shown in Fig. 2) which in turn is supported by arms 37 and 38 fastened to the adjacent inner ends of shafts 39 and 40 which are in axial alignment and separated by a suitable anti-rattle spring. The outer ends of the cross-shafts 39 and 40, which are suitably journaled in brackets on the frame of the vehicle, are secured to arms 41 and 42 (Figs. 1 and 3), respectively, and the lower ends of these arms are connected to the rear ends of rods 43 and 44, respectively, which at their forward ends are pivoted to the upper ends of arms 45 and 46 secured on short shafts 47 and 48, respectively, which are journaled on the opposite side bars of the frame 5. Levers 49 and 50, fastened to the outer ends of the shafts 47 and 48, respectivly, are connected at their upper ends to the rear ends of rods 51 and 52, respectively, which extend forwardly and are connected to the lower ends of arms 53 and 54, respectively, fastened to respective rock shafts 55 and 56 journaled in suitable brackets (omitted in Fig. 1) which are secured to the front axle 57. A spring 33$^a$ (Figs. 8 and 12) connected at one end to the horizontal arm of the bell crank 33 and at its lower end to the bracket arm 25ª normally retains the bell crank 33 and connections in the position shown in the drawings, in which condition of the parts the plunger 27 forcibly retains the right-hand projecting bearings or eyes of the brake-shoe 15 in engagement with the lower arm 25ᵇ of the bracket 25. The front wheels 2 are preferably provided with brakes of the drum type but other forms, such as the disk type, may be employed. Secured to each wheel 2 is a brake drum 58. Within each brake drum and suitably pivoted on pins 86 projecting from a cross-piece 80, preferably integral with the steering knuckle for the front wheel, are brake shoes 82 and 83. Positioned between the free ends of these brake shoes is the cam 85 fast on a shaft 84 journaled in the cross-piece 80 and provided on its inner end with an arm 59. A suitably constructed drag link 60 connects this arm 59 to the ball end of an arm 61 secured to the shaft 55 or the shaft 56, as the case may be. The ball of the arm 61 operates substantially in the axial line of the vertical pins or trunnions by which the steering spindle is pivoted for horizontal oscillation to the forked end of the front axle 57 in the usual manner, so that oscillation of the front wheel, during steering movements of the wheel, does not appreciably change the relationship between the arms 59 and 61 and hence has no effect on the operating cam 85. It is obvious that when the arm 61 is raised, the cam 85 is operated to separate the free ends of the brake shoes 82 and 83 forcing them into frictional engagement with the brake drum 58 to effect the desired braking action on the front wheel, as is well understood in the art. A dust cover 89, in the form of a circular plate, is secured to the cross-member 80 and closes the inner open end of the brake drum 58.

An arm 63 (Figs. 1 and 9) extending inwardly and rearwardly from the cross-member 80 of the left-hand front wheel is connected to the forward end of a rod 64 which at its rear end is connected to a suitable steering gear, not shown in the drawings. The rear ends of the cross-pieces 80 for both front wheels are provided with extensions 65 connected by the usual drag link 66 in order that the front wheels will move in parallelism when oscillated by the steering gear.

From the above description, it is thought that the operation of the mechanism comprising my invention will be obvious. When the foot pedal 20 is depressed, the rod 19 is pulled forwardly, which results in rocking the lever 18 counterclockwise, as viewed in Fig. 6, and as the lever is pivoted to the brackets on the adjacent ends of the brake shoes 15 and 16 it serves to move these ends toward each other, due to its camming action, with the result that the brake shoes are brought into frictional engagement with the suitable frictional material 62 on the outer periphery of the brake drum 14. During forward movement of the vehicle, the drum 14 is rotating in an anti-clockwise direction, as viewed in Fig. 7, and the resistance to the braking effect of the shoes 15 and 16 on the drum 14 has a tendency to rotate the shoes 15 and 16 in the same direction with the drum. This tendency to rotate is opposed partly by the spring 33ª, associated with the plunger 27, but mostly by the resistance offered in expanding the front wheel brakes. As the foot pedal 20 is depressed further, causing the brake shoes 15 and 16 to increase their frictional engagement with the drum 14, the tendency of the shoes to rotate with the drum becomes greater and finally overcomes the resistance action of the spring 33ª and front wheel brakes and the shoes are given a rotational movement the extent of which depends upon the braking effect applied to the brake drum 14. When the brake shoes rotate with the drum, the plunger 27 is elevated, rocking the bell crank 33 clockwise, as viewed in Figs. 3, 8 and 12, which through the above described connections rock the shafts 55 and 56, with the result that the drag links 60 are elevated to apply the front wheel brakes. Due to the fact that greater braking effort is required to apply internal expanding brakes than contracting brakes and as the leverage of the rods 44 and 52 are so proportioned that less braking effort is applied to the front wheels than to the transmission brake, the moment the transmission brake is applied hard enough to lock or slide the rear wheels no more rotation of the transmission brake shoes occurs due to the fact that the drum 14 has stopped rotating and therefore no further force can be applied to the front wheel brakes.

It will therefore be seen from the above, that the amount of braking action applied to the front wheels is dependent upon and proportional to the amount of braking effect applied to the brake drum 14. Only a sufficient pedal pressure is required to operate the transmission brake in order to also cause application of braking action to the front wheels, thus relieving the operator of considerable physical effort, as the automatic turning of the brake shoes of the transmission brake, effected by the movement of the vehicle, is utilized to apply the front wheel brakes without requiring any further pressure on the foot pedal than is necessary to operate the transmission brake. Inasmuch as the braking effect of the front wheel brakes is less than that of the transmission brake, the maximum braking action on the front wheel brakes is not sufficient to lock the front wheels against rotation because the moment the rear wheels are locked the transmission brake shoes rotate no further. In the ordinary type of front wheel brakes it is usually possible to adjust them so that the rear wheels will lock first, but in all of these types, so far as I am aware, further depression of the brake pedal will also lock the front wheels, which is very undesirable as in many cases it causes loss of control of the steering of the vehicle.

As the brake shoes 15 and 16 rotate with the drum 14 during operation of the transmission brake, the rod 19, extending from the bell crank 18 to the pedal 20, is subjected to a twisting effect or torsional strain. The rod 19 is of such diameter and material that the amount of twisting is easily taken up in its length, although a suitable joint may be used in connection with it to permit the rod to rotate without twisting, if desired. The forward end of the radius rod 22 is preferably connected to the bracket on the sub-frame 23 by a suitable joint to accommodate the tendency of the rod to turn when the brake is applied.

Another feature of my invention is the provision of cushioning or dampening means to prevent chattering of the braking mechanism when applied. To this end, I preferably use a dash-pot (Fig. 12) comprising a cylinder 79, suitably secured to the frame 5, and a piston 77 whose connecting rod 78 is connected in any approved manner to the bell crank lever 33.

Although the emergency brakes may be connected in any suitable manner to the transmission brake or front wheel brakes, or the operating connections therefor, I have shown them, for the sake of illustration, as being separately operated by a hand brake lever 67 (Figs. 1 and 3) which is suitably mounted on the frame of the machine and connected at its lower end to the forward end of a rod 68 pivoted at its rear end to an arm 69 secured to a cross-shaft 70. Arms 71 connected to the shaft 70 near the side members of the frame 5 are connected by rods 72 to arms 73 fast on short shafts 74, suitably journaled in flanges on the rear axle housing. The outer ends of the shafts 74 carry suitable cams (not shown) for oscillating brake shoes positioned within brake drums 75 secured to the rear wheels.

It will be understood that the invention is susceptible of various changes and modifications all coming within the scope and spirit of the invention, as defined in the following claims.

I claim:

1. In a motor vehicle, the combination of a transmission brake adapted to exert an immediate and substantial braking effort, braking means for certain of the wheels of the vehicle, mechanism controllable by the operator for operating said transmission brake, and connections operated by said transmission brake for applying said braking means as an incident to the operation of the transmission brake.

2. In a motor vehicle, the combination of propelling mechanism for the vehicle, braking means on and for directly braking said propelling mechanism, such braking means being adapted to exert an immediate and substantial braking effort, means under the control of the operator for applying said braking means, braking means for certain of the wheels of said vehicle, and means automatically operated by said propelling mechanism when the first-mentioned braking means is applied and controlled thereby to apply said second-mentioned braking means.

3. In a motor vehicle, the combination of propelling means for the vehicle, braking means on and for directly braking said propelling mechanism, such braking means being adapted to exert an immediate and substantial braking effort, means under the control of the operator for operating said braking means, braking means for certain of the wheels of said vehicle, and means controlled by said first-mentioned braking means and automatically operated by said propelling mechanism when the first-mentioned braking means is applied to apply the second-mentioned braking means with lesser braking effect than the braking effect of said first-mentioned braking means.

4. In a motor vehicle, the combination of braking means for braking one set of wheels, braking means for braking another set of wheels, mechanism operated by the operator for applying said first-mentioned braking means, and connections operated by said first-mentioned braking means for applying said second-mentioned braking means with lesser braking effect than the braking effect of said first mentioned braking means.

5. In a motor vehicle, the combination of braking means for braking certain of the wheels of said vehicle, mechanism controlled by the operator for applying said braking means, braking means for braking other of said wheels, and means whereby the braking action of the first-mentioned braking means utilizes the movement of the vehicle to automatically apply said second-mentioned braking means with lesser braking effect than the braking effect of said first-mentioned braking means.

6. In a motor vehicle, a transmission brake adapted to exert an immediate and substantial braking effort, braking means for certain of the wheels of said vehicle, mechanism controllable by the operator for applying the transmission brake, and connections operated by the transmission brake for applying said braking means with lesser braking effect than the braking effect of the transmission brake.

7. In a motor vehicle, the combination of braking means for braking one set of wheels, braking means for braking another set of wheels, means controlled by the operator for applying braking action on one set of wheels, means whereby said braking action causes partial rotation of the braking means for said set of wheels when the vehicle is in motion, means operated by said partial rotation to cause a braking action on the other set of wheels, and means for dampening said rotative movement.

8. In a motor vehicle, the combination of means operable by the operator for applying a braking action to a road wheel, said means including a frictional device adapted to be displaced from its normal position by the resistance offered to such braking action, braking means for another road wheel, means operated by the displacement of said frictional device to cause said second-mentioned braking means to apply a braking action to said second-mentioned road wheel, and means for dampening the displacing action of said frictional device.

9. In a motor vehicle, the combination of means controllable by the operator for applying a braking effect to a road wheel, said means including a frictional device adapted to be rotated out of its normal position when effecting a braking action due to the resistance to said action by the movement of said vehicle, braking means for applying braking effect to another wheel, and means connecting said frictional device and said second-mentioned braking means whereby said rotatable movement of said frictional device operates said second-mentioned braking means to apply a lesser braking effect on said second-mentioned wheel than is applied by said first-mentioned brake means.

10. In a motor vehicle, a transmission brake adapted to exert an immediate and substantial braking effort and front wheel brakes, said transmission brake including a drum and shoes, means controlled by the operator for causing said shoes to engage said drum, means permitting said shoes to be moved a limited amount in the direction of rotation of said drum when engaging the same due to the resistance offered to such braking action, and connections between said front wheel brakes and said shoes whereby said rotational movement of said shoes applies the front wheel brakes.

11. In a motor vehicle, a transmission brake adapted to exert an immediate and substantial braking effort and front wheel brakes, said transmission brake including a drum and shoes, means controlled by the operator for causing said shoes to engage said drum, means permitting said shoes to be moved a limited amount in the direction of rotation of said drum when engaging the same due to the resistance offered to such braking action, and connections between said front wheel brakes and said shoes whereby said rotational movement of said shoes applies the front wheel brakes, with lesser braking effect than the braking effect of the transmission brake.

12. In a motor vehicle, the combination of a transmission brake and front wheel brakes, said transmission brake including a drum and shoes, means connected to a foot lever for causing said shoes to engage said drum, means permitting said shoes to be moved a limited amount in the direction of rotation of said drum when engaging the same due to the resistance offered to such braking action, means for causing a dampening action on said rotation of said shoes, a bell crank connected to said shoes, and connections between said front wheel brakes and said bell crank whereby said rotational movement of said shoes applies said front wheel brakes.

13. In a motor vehicle, the combination of a transmission brake and front wheel brakes, said transmission brake including a drum and shoes adapted to engage said drum, means operable by a foot pedal for causing said shoes to engage said drum, means permitting said shoes to be displaced in the direction of rotation of said drum an amount proportionate to the resistance offered to the braking action of said shoes on said drum, and connections operated by the displacing of said shoes for applying the brakes on the front wheels, the connections being constructed so that the maximum braking effect on the front wheels will not lock the same.

14. In a motor vehicle, the combination of a transmission brake adapted to exert an immediate and substantial braking effort and including a normally stationary frictional element adapted to be displaced from its normal position due to the resistance of the vehicle to a braking action when the brake is applied, front wheel brakes, connections between said normally stationary frictional element and said front wheel brakes operated by the displacement of said frictional element and including means for equalizing the braking action of the front wheel brakes.

15. In a motor vehicle, the combination of a propeller shaft, a transmission brake mounted on said shaft, braking means for certain of the wheels of said vehicle, mechanism controllable by the operator for operating said transmission brake, and connections operated by said transmission brake for applying said braking means as an incident to the operation of said transmission brake.

16. In a motor vehicle, the combination of propelling mechanism including a propeller shaft, a brake mechanism on and for directly braking said shaft means under the control of the operator for applying said shaft brake, braking means for certain of the wheels of the vehicle, and means automatically operated upon the operation of said shaft brake to apply said wheel brakes.

17. A vehicle having, in combination, a driver-operated booster brake, a second brake, connections from the booster brake for operating the second brake, and a safety stop for the connections to limit movement of the booster brake to cause it to retard movement of the vehicle even if resistance of the second brake is eliminated by a break in the connections.

18. Brake means comprising a first brake, a second brake operated by a connection between the two brakes, a stop on the connection and a fixed abutment for engagement with said stop whereby the first brake may be operable if the second brake becomes inoperable.

19. In a motor vehicle having front and rear road wheels, brakes for said front wheels, a propeller shaft for driving said rear wheels, a brake drum on said propeller shaft adapted to rotate at the same speed therewith, braking means having a movable anchor engageable with said brake drum, a lever connected with said front brakes operatively engaging said movable anchor, and means for moving said braking means into engagement with said brake drum to brake said rear wheels, said braking means being rotated with said brake drum to move said lever for incidentally applying said front wheel brakes.

20. In a motor vehicle having front and rear road wheels, brakes for said front wheels, a lever connected with said brakes, a propeller shaft for driving said rear wheels, and a brake for said rear wheels comprising a brake drum mounted on said propeller shaft, a pair of brake shoes engageable therewith, a movable anchor pin pivotally connecting said shoes, a member connected to said lever movable by said shoes, and operating means for engaging said shoes with said brake drum to brake said rear wheels, said shoes being rotated with said brake drum to actuate said lever to apply said front brakes.

21. In a motor vehicle having front and rear road wheels, brakes for said front wheels, a lever connected with said brakes, a propeller shaft for driving said rear wheels, and a brake for said propeller shaft comprising a drum mounted thereon, a pair of brake shoes contractable to engage said drum, a movable anchor pin common to said shoes, a longitudinally movable plunger connected with said lever engaging said shoes, and a lever connected with said shoes operatable to contract the same into engagement with said brake drum for braking said rear wheels, said brake shoes being rotated with said brake drum to actuate said first mentioned lever to apply said front wheel brakes as an incident to the braking of said rear wheels.

22. A motor vehicle having front and rear road wheels, brakes for said front wheels, a lever connected with said brakes, a propeller shaft for said rear wheels, and a brake for said propeller shaft comprising a brake drum mounted thereon, brake shoes engageable therewith having a common movable anchor pin, a connection between said lever and shoes, a lever connected with said brake shoes for moving the same into engagement with said drum to brake said propeller shaft, said shoes being rotated with said drum to actuate said first mentioned lever whereby said front wheel brakes are applied as an incident to said propeller shaft brake, and universally movable means holding said shoes against longitudinal movement, said means being adapted to permit rotation of said shoes.

23. A motor vehicle having front and rear road wheels, brakes for said front wheels, a lever connected with said brakes, a propeller shaft for said rear wheels, and a brake for said propeller shaft comprising a brake drum mounted thereon, brake shoes engageable therewith having a common movable anchor pin, a connection between said lever and shoes, a lever connected with said brake shoes for moving the same into engagement with said drum to brake said propeller shaft, said shoes being rotated with said drum to actuate said first mentioned lever whereby said front wheel brakes are applied as an incident to said propeller shaft brake, and a radius rod anchored at one end holding said shoes against longitudinal movement, said radius rod being adapted to permit rotation of said shoes.

VINCENT LINK.